United States Patent [19]

Poll et al.

[11] Patent Number: 5,115,088
[45] Date of Patent: May 19, 1992

[54] MOLDING COMPOSITION COMPOSED OF A THERMOPLASTICALLY PROCESSABLE AROMATIC POLYAMIDE

[75] Inventors: Günter Poll, Marl; Martin Bartmann, Recklinghausen; Jürgen Finke, Marl, all of Fed. Rep. of Germany

[73] Assignee: Huels Aktiengesellschaft, Marl, Fed. Rep. of Germany

[21] Appl. No.: 603,038

[22] Filed: Oct. 24, 1990

[30] Foreign Application Priority Data

Oct. 25, 1989 [DE] Fed. Rep. of Germany ....... 3935468

[51] Int. Cl.$^5$ .............. C08G 69/28; C08G 8/02; C08G 63/00
[52] U.S. Cl. .................. 528/336; 528/125; 528/171; 528/176; 528/179; 528/182; 528/183; 528/185

[58] Field of Search .............. 528/125, 171, 176, 179, 528/336, 182, 183, 185

[56] References Cited

U.S. PATENT DOCUMENTS 4,720,538  1/1988  Bartmann .................. 528/336
5,015,680  5/1991  Finke et al. ................ 524/99

Primary Examiner—Harold D. Anderson
Assistant Examiner—T. Mosley
Attorney, Agent, or Firm—Millen, White & Zelano

[57] ABSTRACT

The invention provides aromatic polyamides having a reduced melt viscosity which are derived from aromatic dicarboxylic acids, aromatic diamines and aromatic monocarboxylic acids being present in the polyamide in an amount of from 0.01 to 10 mol %. The invention allows molding compositions to be provided which have improved processability and good mechanical properties.

18 Claims, No Drawings

MOLDING COMPOSITION COMPOSED OF A THERMOPLASTICALLY PROCESSABLE AROMATIC POLYAMIDE

CROSS-REFERENCE TO RELATED APPLICATION

Concurrently filed applications Ser. No. 07/602,544 entitled "Process for the Preparation of a Polyamide" by Poll et al., which claims priority to 3935466.0, filed Oct. 25, 1989, and Ser. No. 07/603,042 entitled "Process for the Preparation of Thermoplastically Processible Aromatic Polyamide" by Poll et al., which claims priority to DE 3935467.9, filed Oct. 25, 1989, are related to the subject matter of this application and are assigned to the same assignee.

BACKGROUND OF THE INVENTION

The invention relates to molding compositions composed of a thermoplastically processable aromatic polyamide.

Aromatic polyamides based on diamines of the general formula

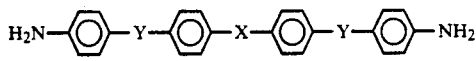  (I)

are described, for example, in DE-A-3,609,011. However, the melt viscosity of these aromatic polyamides is very high. Very high temperatures are, therefore, necessary for their preparation and processing, generally at least 350° C. At these temperatures, damage to the product is often observed, recognizable from discolorations or a deterioration in mechanical properties.

SUMMARY OF THE INVENTION

The invention provides molding compositions, methods for producing such molding compositions, and articles obtained therefrom, where the molding compositions are based on aromatic polyamides, which are derived from the following monomers:
Component (A) HOOC—Ar—COOH
Component (B) H₂N—Ar'—NH₂
Component (C) R'—COOH
in which the symbols have the meanings which follow
Ar=1,3- or 1,4-phenylene; 1-4-, 1,5-, 2,6- or 2,7-naphthylene,

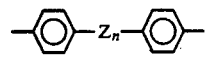  (II)

or

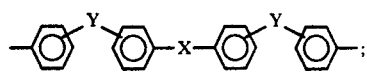  (III)

$Ar^1 =$ 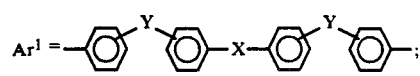  (IV)

X=—SO₂—; —CO—;
Y=—O—; —S —;
S=—O—; —S—; —SO₂—; —CO—; —CR₂—;
R=—H; C₁-C₄-alkyl;

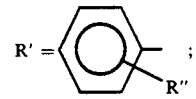  (V)

  (VI)

1- or 2-naphthyl;

R"=—H; C₁-C₄-alkyl; halogen;
n=0; 1,
while the component C is present in the polyamide in an amount of from 0.01 to 10 mol% relative to the sum of the components A and B.

It is an object of this invention to provide molded articles composed of aromatic polyamides which do not contain recognizable discolorations or suffer from a deterioration in mechanical properties. Another object of this invention is to provide compositions with a low melt viscosity that will form these molded articles when molded and a further object of this invention is to provide methods for making such low viscosity molding compositions. These and other objects will be readily apparent from the disclosure herein.

The component C according to the invention is a low molecular weight aromatic monocarboxylic acid whose aromatic radical may be substituted by halogen or C₁- to C₄-alkyl radicals.

Preference is given to the use of benzoic acid, 1-or 2-naphthoic acid, biphenyl-4-carboxylic acid, substituted benzoic acids or naphthoic acids such as toluolic acid, bromo-, chloro- or fluoro-benzoic acid or bromo-, chloro- or fluoro-naphthoic acid as the aromatic monocarboxylic acid component C.

Instead of the aromatic monocarboxylic acids, it is also possible to use the reaction products obtained from pre-polycondensation of the diamine component B and aromatic monocarboxylic acid component C.

The aromatic dicarboxylic acids (component A) used include, but are not limited to, isophthalic acid, terephthalic acid, 1,4-, 1,5-, 2,6-, and 2,7-naphthalenedicarboxylic acid, 4,4'-diphenyl ether dicarboxylic acid or 4,4'-benzophenonedicarboxylic acid, 4,4'-diphenyl sulfone dicarboxylic acid, 2-phenoxyterephthalic acid, 4,4'-biphenyldicarboxylic acid or mixtures thereof.

Examples of aromatic diamines (component B) are:
4,4'-bis(4-aminophenoxy)diphenyl sulfone;
4,4'-bis(3-aminophenoxy)diphenyl sulfone;
4,4'-bis(4-aminophenoxy)benzophenone;
4,4'-bis(3-aminophenoxy)benzophenone;
4,4'-bis(p-aminophenylmercapto)benzophenone;
4,4'-bis(p-aminophenylmercapto)diphenyl sulfone;
or mixtures thereof.

Preference is given to the use of isophthalic acid; 4,4'-bis(4-aminophenoxy)diphenyl sulfone; benzoic acid and combinations thereof in forming the aromatic polyamide within the molding composition.

The aromatic polyamides are formed by a polycondensation reaction carried out in the presence of catalysts. Suitable catalysts for this purpose are phosphorus-containing compounds such as triphenyl phosphite or acids of the general formula H₃POₘ in which m=2 to 4. It is also possible to use, mixed with these substances, tin(II) compounds such as, for example, tin(II) salts of organic carboxylic acids.

It is also known to additionally use co-catalysts such as, for example, dialkylaminopyridines.

The catalysts are used in amounts of from 0.05 to 4 mol %, preferably 0.1 to 2 mol %, relative to the sum of components A and B.

The mole ratio of the components A and B is variable in the region of approximately 1:1. Preferably, the ratio A:B is 0.95:1.0 to 1.0:1.0 and most preferably, the ratio A:B is 0.98:1.0 to 1.0:1.0. The component C according to the invention is present in the polyamide in an amount of from 0.01 to 10 mol %, preferably from 0.05 to 8 mol %, relative to the sum of A and B.

The glass transition temperature ($T_g$) of the polyamides according to the invention is generally in the range of from 190° to 270° C., the viscosity number (J values) is approximately 30 to 90 cm$^3$/g; preferably 60 to 80 cm$^3$/g and the melt flow index at 320° C. (21.6 Kg) is between 2 to 40 cm$^3$/10 min., preferably between 2.5 to 20 cm$^3$/10 min. The preparation of the aromatic polyamides is known in principle and is described, for example, in DE-A-3,609,011. The aromatic monocarboxylic acid is preferably used together with the monomer components A and B at the start of the polycondensation reaction. However, it is also possible to add the said aromatic monocarboxylic acid only towards the end of the polycondensation after the desired viscosity number has been achieved. The molecular weight can be increased by subjecting the aromatic polyamides to solid phase post-condensation in an inert gas atmosphere as described by H. G. Elias, *Macromolecules* (Vol. 2), Plenum Press, N.Y. (1977), page 621. The polyamides can be processed in conventional blending machines to give the molding composition according to the invention.

The molding compositions are preferably 100% by weight polyamide, but they may contain fillers such as talc or reinforcing agents such as glass fibers, ARAMID ® fibers or carbon fibers and also other customary additives such as, for example, pigments or stabilizers to the extent that the portion of polyamide is reduced to 40% by weight.

The molding compositions are processed by conventional methods such as injection molding, extrusion and the like to give moldings, fibers, films and so on. Equally, it is possible to use the molding compositions as coating compositions starting from powder (for example, fluidized bed coating) from a liquid dispersion or from solution.

Surprisingly, the molding compositions according to the invention have a significantly improved resistance to thermal degradation during processing than the prior art molding compositions. Moreover, it is particularly advantageous that, owing to the reduced melt viscosity of the polyamides, the processing temperatures, such as those used during molding, can be lowered. The processing of the polyamides is typically carried out at temperatures in the range from 280°-360° C., preferably 320°-340° C., thus providing thermoplastically processable molding compositions.

The quantities mentioned in the description and in the examples were determined with the help of the methods which are given below.

The DSC examinations for determining the glass transition temperature ($T_g$) were carried out using a Perkin-Elmer calorimeter DSC-1B at a heating rate of 16 K/min.

The viscosity numbers (J) were determined from 0.5% strength by weight solutions of the polymers in a phenol/ o-dichlorobenzene mixture (1:1 parts by weight) at 25° C. in accordance with DIN 53 728, which is closely connected to International Standard 150 1191.

The melt flow index (MFI) was determined on a Gottfert viscometer at 320° C. and 21.6 kg load in accordance with DIN 53 735-MFI-B, which is closely connected to International Standard (150) 1133.

The examples designated by letters are not according to the invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications, if any, cited above and below, and of corresponding West German Application No. P 39 35 468.7, are hereby incorporated by reference.

EXAMPLES

Example 1

21.62 g (0.05 mol) of 4,4'-bis(4-aminophenoxy)-diphenyl sulfone, 8.31 g (0.05 mol) of isophthalic acid and 0.61 g (0.05 mol) of benzoic acid were melted with 155 mg (0.0005 mol) of triphenyl phosphite and 61 mg (0.0005 mol) of 4-N,N-dimethylaminopyridine in a polycondensation reactor fitted with a stirrer, nitrogen feed and distillation side arm, at 250° C. After 20 minutes, the temperature was increased to 300° C. At the same time, the viscosity of the melt steadily increased, while the water liberated during the course of the reaction was distilled off. After 10 minutes, the temperature was increased to 320° C. and kept at this temperature for 60 minutes.

The viscosity number (J) (phenol/1.2 -dichlorobenzene, 0.5 % by weight) was 63 cm$^3$/g.

The MFI was 9.4 cm$^3$/10 min.

Examples 2-10 and Example A

Examples 2-10 and Example A were carried out similarly to Example 1. The components of these polyamides and the results of the tests are summarized in the following table. In contrast to Examples 2-10, Example A had to be terminated after 30 min at 320° C. since, due to the high melt viscosity, the reaction mixture could no longer be stirred.

TABLE

| Example | BAPS[1] [mol] | IPA[2] [mol] | Component C. | [mol] | Catalyst | [mol %] | Co-catalyst | [mol %] | J [cm$^3$/g] | MFI [cm$^3$/10 min] |
|---|---|---|---|---|---|---|---|---|---|---|
| 1 | 0.05 | 0.05 | BA[3] | 0.005 | P(OPh)$_3$[9] | 1.0 | DMAP[10] | 1.0 | 63 | 9.4 |
| 2 | 0.05 | 0.045 | BA | 0.01 | H$_3$PO$_2$ | 1.0 | DMAP | 1.0 | 52 | 15.1 |

TABLE-continued

| Example | BAPS[1] [mol] | IPA[2] [mol] | Component C. | [mol] | Catalyst | [mol %] | Co-catalyst | [mol %] | J [cm³/g] | MFI [cm³/10 min] |
|---|---|---|---|---|---|---|---|---|---|---|
| 3 | 0.05 | 0.048 | BA | 0.01 | H₃PO₃ | 3.0 | DMAP | 3.0 | 57 | 12.6 |
| 4 | 0.05 | 0.047 | BA | 0.01 | H₃PO₃ SAOx[11] | 1.4 1.4 | — | — | 54 | 13.9 |
| 5 | 0.05 | 0.046 | BA | 0.015 | P(OPh)₃ | 1.4 | POPy[12] | 1.4 | 45 | 17.2 |
| 6 | 0.05 | 0.047 | 1-NaA[4] | 0.008 | P(OPh)₃ | 1.4 | DMAP | 1.4 | 66 | 8.7 |
| 7 | 0.05 | 0.047 | 2-NaA[5] | 0.008 | P(OPh)₃ | 1.4 | DMAP | 1.4 | 59 | 10.4 |
| 8 | 0.05 | 0.047 | Cl-BA[6] | 0.007 | P(OPh)₃ | 1.4 | DMAP | 1.4 | 68 | 7.1 |
| 9 | 0.05 | 0.047 | BiCA[7] | 0.007 | P(OPh)₃ | 1.4 | DMAP | 1.4 | 65 | 8.7 |
| 10 | 0.05 | 0.05 | BBB[8] | 0.005 | P(OPh)₃ | 1.4 | DMAP | 1.4 | 61 | 10.3 |
| A | 0.05 | 0.05 | — | — | P(OPh)₃ | 1.4 | DMAP | 1.4 | 105 | <0.2 |

[1] 4,4'-Bis(4-aminophenoxy)diphenyl sulphone
[2] Isophthalic acid
[3] Benzoic acid
[4] 1-Naphthoic acid
[5] 2-Naphthoic acid
[6] 4-Chlorobenzoic acid
[7] Biphenyl-4-carboxylic acid
[8] 4,4'-Bis(4-aminophenoxy)diphenyl sulphone bisbenzoate
[9] Triphenyl phosphite
[10] 4-Dimethylaminopyridine
[11] Tin(II) oxalate
[12] Phenoxypyridine The preceding examples can be repeated with similar success by substituting the generically or specifically described reactants and/or operating conditions of this invention for those used in the preceding examples.

From the foregoing description, one skilled in the art can easily ascertain the essential characteristics of this invention, and, without departing from the spirit and scope thereof, can make various changes and modifications of the invention to adapt it to various usages and conditions.

What is claimed is:

1. A molding composition comprising thermoplastically processable aromatic polyamide derived from the following monomers:

Component (A) HOOC—Ar—COOH
Component (B) H₂N—Ar'—NH₂
Component (C) R'—COOH wherein the symbols have the meanings which follow
Ar is 1,3- or 1,4-phenylene; 1,4-, 1,5-, 2,6- or 2,7-naphthylene;

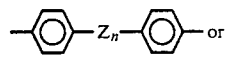

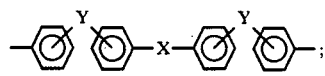

Ar' is 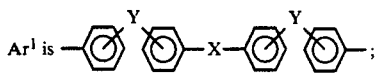

X=—SO₂—; —CO—;
Y=—O—; —S—;
Z=—O—; —S—; —SO₂—; —CO—; —CR₂—;
R=—H; C₁-C₄-alkyl;

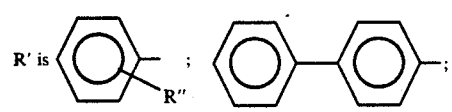

1- or 2-naphthyl;

R"=—H; C₁-C₄-alkyl; halogen;

n=0; 1, where the component C is present in said aromatic polyamide in an amount of from 0.01 to 10 mol % relative to the sum of components A and B.

2. A molding composition according to claim 1, wherein Ar is 1,3-phenylene.

3. A molding composition according to claim 1, wherein Ar' has the meaning which follows Ar' is 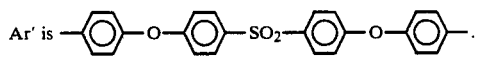.

4. A molding composition according to claim 1 wherein R' has the meaning which follows R' is 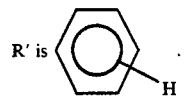

5. A molding composition according to claim 1, wherein the aromatic polyamide is derived from component C in an amount of from 0.5 to 8 mol %, relative to the sum of components A and B.

6. A molding composition according to claim 1, wherein the aromatic polyamide is derived from isophthalic acid, 4,4'-bis(4-aminophenoxy)diphenyl sulfone and component C is selected from the group consisting of benzoic acid, 1-naphthoic acid, 2-naphthoic acid, biphenyl-4-carboxylic acid, toluic acid, bromobenzoic acid, chlorobenzoic acid, fluorobenzoic acid, bromonaphthoic acid, chloronaphthoic acid and fluoronaphthoic acid.

7. A molding composition as in claim 1, which is thermoplastically processable at temperatures less than 350° C.

8. A molding composition as in claim 7, wherein the aromatic polyamide has a glass transition temperature in the range of from 190° to 270° C. as determined by a Perkin-Elmer Differential Scanning Calorimeter at a heating rate of 16 K/min.

9. A molding composition as in claim 7, wherein the aromatic polyamide has a melt flow index greater than 7 cm³/10 min., as determined on a Gottfert viscometer at 320° C. and 21.6 kg load in accordance with DIN 53 735-MFI-B.

10. A molding composition as in claim 1, which comprises 40 to 100 wt. % aromatic polyamide.

11. A molded article comprised of a molding composition of claim 1.

12. An extruded article comprised of a molding composition of claim 1.

13. A coated article wherein said coating is comprised of a molding composition of claim 1.

14. A method for producing a molding composition comprised of aromatic polyamides derived for the monomers:

Component (A) HOOC—Ar—COOH
Component (B) H$_2$N—Ar'—NH$_2$
Component (C) R"—COOH in which the symbols have the meanings which follow
Ar is 1,3- or 1,4-phenylene; 1,4-, 1,5-, 2,6- or 2,7-naphthylene;

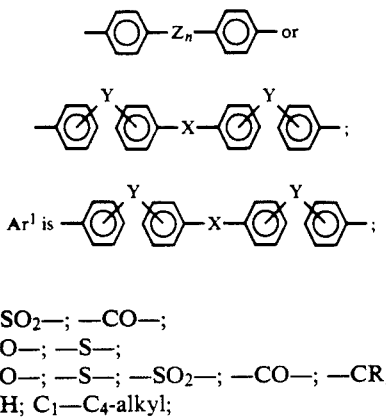

X = —SO$_2$—; —CO—;
Y = —O—; —S—;
Z = —O—; —S—; —SO$_2$—; —CO—; —CR$_2$—;
R = —H; C$_1$—C$_4$-alkyl;

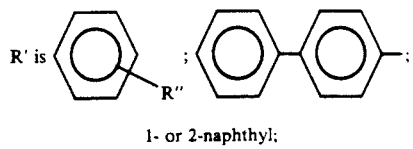

1- or 2-naphthyl;

R" = —H; C$_1$—C$_4$-alkyl; halogen;
n = 0; 1, where the component C is present in said aromatic polyamide in an amount of from 0.01 to 10 mol % relative to the sum of components A and B,
wherein said monomers are reacted in the presence of a polycondensation catalyst selected from the group consisting of triphenylphosphite and acids of the formula H$_3$PO$_m$, wherein m=2 to 4, in an amount of from 0.05 to 4 mol %, based on the sum of components A and B.

15. A method as in claim 14, wherein the monomers are condensed in the presence of a cocatalyst selected from the group consisting of phenoxypyridene and 4-dimethylaminopyridine.

16. A molding composition according to claim 1, in which component C is selected from the group consisting of benzoic acid, 1-naphthoic acid, 2-naphthoic acid, biphenyl-4-carboxylic acid, toluic acid, bromobenzoic acid, chlorobenzoic acid, fluorobenzoic acid, bromonaphthoic acid, chloronaphthoic acid and fluoronaphthoic acid.

17. A molding composition according to claim 16 which is thermoplastically processable at temperatures in the range of 200° C. to 340° C.

18. A molding composition according to claim 16, wherein the aromatic polyamide has a melt flow index in the range of 7 to 20 cm$^3$/10 min. determined on a Gottfert viscometer at 320° C. and 21.5 kg load in accordance with DIN 53 735-MFI-B.

* * * * *